United States Patent
Huntzinger

[15] 3,645,241
[45] Feb. 29, 1972

[54] BISTABLE THROTTLE CONTROL SYSTEM

[72] Inventor: Gerald O. Huntzinger, Anderson, Ind.
[73] Assignee: General Motors Corporation, Detroit, Mich.
[22] Filed: Apr. 16, 1970
[21] Appl. No.: 29,111

[52] U.S. Cl.............................................123/102, 207/254
[51] Int. Cl.......................................................F02d 9/00
[58] Field of Search....................123/97, 97 B, 102; 307/293

[56] References Cited

UNITED STATES PATENTS

| | | | |
|---|---|---|---|
| 3,332,406 | 7/1967 | Perry et al. | 123/102 |
| 3,456,628 | 7/1969 | Bassot et al. | 123/139 E |
| 2,988,074 | 6/1961 | Lobdell et al. | 123/97 |

Primary Examiner—Laurence M. Goodridge
Attorney—E. W. Christen, C. R. Meland and Albert F. Duke

[57] ABSTRACT

A throttle valve the complete closure of which is prevented by a throttle stop that is advanced by electrically activated vacuum means above a preset speed of an engine responsive to the setting of the throttle valve and retracted below this speed. Pulse generating means connected with the engine provide an input to a timing stage that is operatively connected by capacitor, Zener diode, and amplifier means to means that advance and retract the throttle stop when the speed of the engine is respectively above and below the preset speed.

3 Claims, 1 Drawing Figure

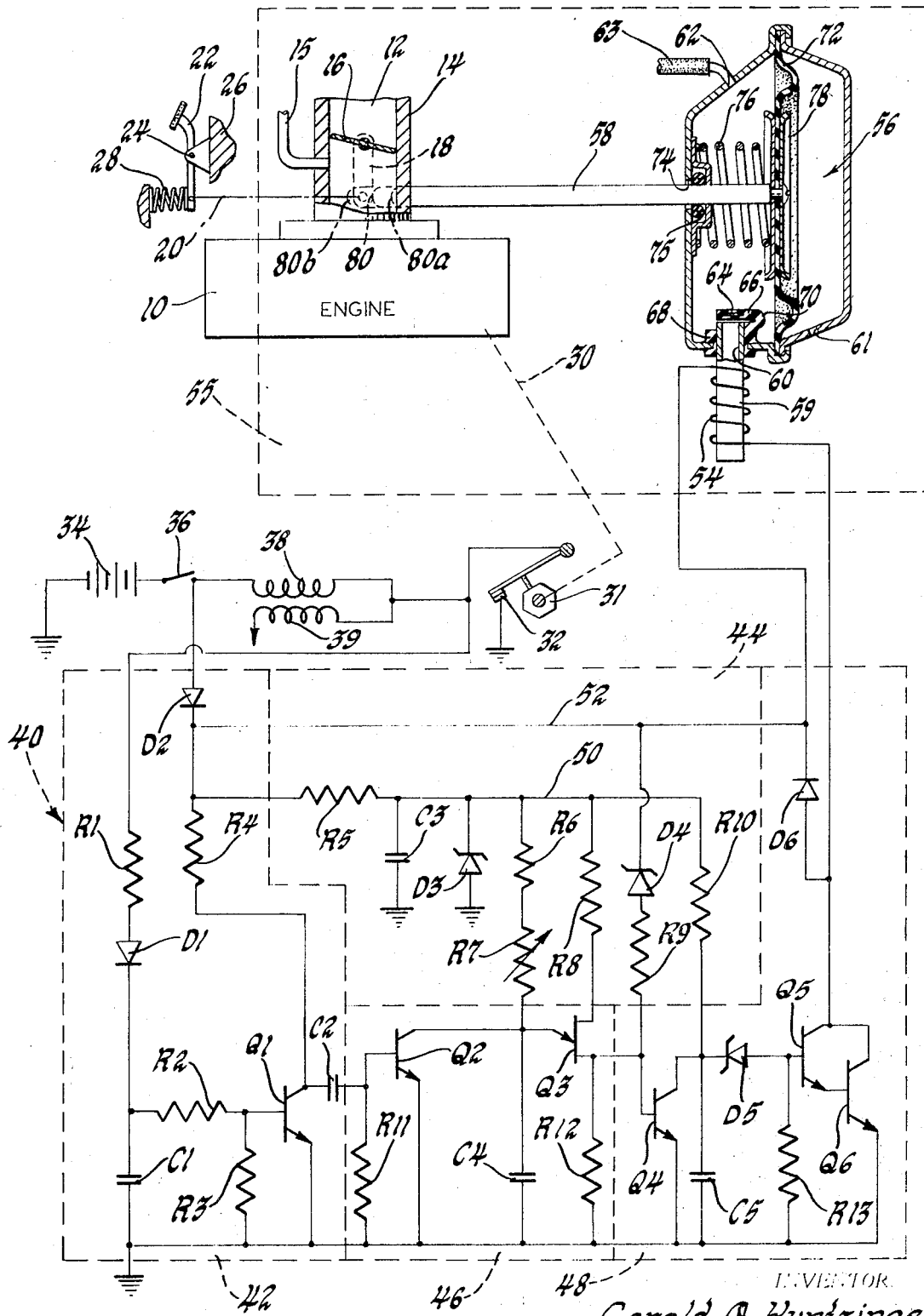

3,645,241

BISTABLE THROTTLE CONTROL SYSTEM

This invention relates to a throttle control system having electrical means for activating utilization means when the speed of an apparatus to be controlled exceeds a predetermined speed and thereafter deactivating the utilization means when the speed of the apparatus returns below the predetermined limit.

A specific response is often desired when the speed of an apparatus to be controlled exceeds a predetermined level and where the response is subsequently to be deactivated when the speed falls below that level. As one example, when the accelerator pedal on a vehicle powered by an internal combustion engine is released to allow deceleration, it is nevertheless desirable to keep the throttle valve in the intake of the carburetor open slightly even though the valve is connected to the accelerator pedal and would tend to be closed thereby. A slightly open throttle valve allows the vacuum maintained by the decelerating engine to continue to draw air through the carburetor and allow this air to be mixed with fuel still being sucked into the carburetor at a rate proportional to the speed of the engine. Being mixed with the air admitted through the slightly open throttle valve the fuel injected into the carburetor is then burned more completely since complete combustion is effected more readily with the resulting air fuel mixture than with the highly rich mixture that might be experienced if the throttle valve were allowed to close. Further, it is also desirable to allow the valve that is kept open slightly during engine deceleration to close when the engine speed drops below the predetermined limit. Otherwise, unnecessarily high idle speeds might be maintained thereby possibly affecting the engine performance, allowing the engine to stall upon braking, etc.

Solenoids and other devices for either maintaining throttle valves open during certain conditions or closing them under other conditions are known in the art. However, it has not been known heretofore how to employ one system to both keep the throttle open and then allow it to close as the engine speed first exceeds a predetermined limit and then subsequently returns below it.

The present system, however, employs a speed sensitive circuit allowing such features to be obtained. The circuit is comprised basically of a unijunction transistor configured to be a timing circuit the outputs from which are enabled below a predetermined speed and are disabled above it. Even though pulses having frequency varying with engine speed could be picked up at other locations, the input to this timing circuit is taken from the breaker points of the distributor in the ignition system for the engine and is applied to the unijunction via first a pulse shaping circuit and then an input transistor. If the period between breaker pulses is shorter than that of the period associated with predetermined speed, a capacitor connected to both the input transistor and the emitter of the unijunction is discharged through the former before being charged sufficiently to break down the latter. If the period between pulses is longer than that associated with the predetermined speed, the unijunction is fired at a rate determined by the capacitor and the reference voltage from which it is charged. The output of the unijunction when thus enabled below the preset speed switches an inverting transistor to discharge a capacitor connected to a Zener diode. When the unijunction is not enabled above the preset speed, the inverting transistor allows the capacitor to charge up to break down the Zener diode and energize utilization means, here including a winding in a vacuum-operated power unit. This causes the tip of a plunger on vacuum-operated power unit to arrest the motion of the linkage controlling the throttle valve.

To assure that the timing characteristics of both the capacitor tied to the emitter of the unijunction and the capacitor tied to the Zener diode in the output stage do not vary with changes in their supply voltages, both capacitors are connected to a voltage supply that is maintained constant, here by a Zener diode connected between ground and a conductor connected to the positive terminal of the battery. With an unregulated reference, the switching frequency of the unijunction might otherwise vary to correspond with a range of frequencies of the device to be controlled or the output circuit might be deactivated at a speed not the same as that at which it was activated.

This constant reference not only allows the unijunction to stop switching and the output stage to cause the throttle stop to advance precisely when the predetermined frequency is exceeded, but also, and just as important, it causes the unijunction to start switching and the output circuit to cause the throttle stop to retract precisely when the speed returns below the predetermined frequency. The result is that there is no "hysteresis" between the frequency at which the throttle stop is advanced and that at which it is retracted. The circuit is therefore termed bistable since an output is either effected or not by whether the set frequency is exceeded or not.

It is, therefore, a general object of the present invention to provide electrical means responsive to the actual speed of an engine to prevent the throttle valve of the engine from closing above a predetermined speed and allow it to close below such speed.

It is another object of the present invention to provide a system of the foregoing type wherein the engine speed above which the electrical means activate one response from utilization means is substantially the same speed below which the electrical means deactivate such response.

It is a further object of the present invention to provide a frequency sensitive circuit comprised of a timing stage that compares the frequency of the pulses produced by the apparatus to be controlled with a predetermined frequency and that in turn activates and deactivates utilization means operatively connected with the apparatus depending on whether the predetermined frequency is exceeded or not.

It is a further and more specific object of the present invention to provide a frequency sensitive bistable circuit for controlling the advancement and retraction of the throttle stop of the throttle valve of an internal combustion engine wherein the difference between the frequency above which the circuit is activated and the frequency below which it is deactivated is minimized by means of a capacitor and a Zener diode connected in the output stage of the circuit.

These and other objects of the present invention will be apparent from the description below taken with reference to:

The drawing wherein a preferred embodiment of the bistable frequency sensitive circuit is shown connected between the throttle valve and breaker points of an internal combustion engine.

With reference now to the drawing, it may be seen that air for an engine 10 is provided through an intake passage 12 in carburetor 14 where the airflow is mixed with fuel supplied through an idle port 15 and is controlled by throttle valve 16. Throttle valve 16 is pivoted in passage 12 above port 15 by lever 18 connected to rod 20 which is activated by accelerator 22 pivoted on hub 24 mounted to fire wall 26 and biased therefrom by spring 28. With the depression of pedal 22 throttle valve 16 is opened to increase flow to engine 10, and with the release of pedal 22, spring 28 acting on pedal 22 causes rod 20 to move lever 18 so as to close valve 16.

Due to a mechanical linkage 30 between the crank shaft of engine 10 and distributor cam 31, distributor breaker points 32 are opened and closed at a frequency proportional to speed of the engine 10. With such operation of breaker points 32, energy from battery 34 is supplied through ignition switch 36 to primary ignition coil 38, which upon the opening of points 32 induces a voltage in secondary coil 39 connected to the spark plugs (not shown).

The voltage pulses induced by this action of the breakers is also applied to frequency sensitive circuit 40 comprised generally of input and shaper stage 42, voltage reference and protection stage 44, unijunction timing stage 46, output stage 48, and supply conductors 50 and 52. Output stage 48 is also operatively connected to a winding 54 in utilization means 55 here in the form of a vacuum power unit 56, throttle stop rod 58, throttle lever 18, throttle valve 16, and carburetor 14.

Input stage 42 is comprised of resistors R1, R2, R3, and R4, diode D1, capacitors C1 and C2, and transistor Q1. The base of transistor Q1 is connected to the node between breaker points 32 and coils 38 and 39, across resistor R1 which attenuates the breaker-induced voltage, across forwardly connected diode D1 which protects transistor Q1 against reverse voltages, across resistor R2 and capacitor C1 which filter signal variations due to speed, coil types, and spark plug conditions, and across resistor R3 which biases the Q1 base. The Q1 collector is connected to and energized from battery 34 via ignition switch 36, forward diode D2, and resistor R4. The Q1 collector is also connected to capacitor C2 which differentiates the trailing edge of the pulse thereat to convert the variable sloped front of the input signal to a sharp-edged input pulse suitable for precision timing purposes in the following unijunction timing 46.

Voltage reference and protection stage 44 is comprised generally of conductors 50 and 52, Zener diodes D3 and D4, capacitor C3, and resistors R5, R6, R7, R8, R9, and R10. Capacitor C3 and resistor R5 act as a filter to prevent high-frequency transients in the ignition system from appearing on conductor 50, and Zener diode D3 clamps the potential of conductor 50 at a constant potential with respect to ground. Variable resistor R7 connected in series with R6 permits the timing of unijunction timing stage 46 to be adjusted, and resistors R8 and R10 provide proper temperature compensation and timing characteristics respectively for timing stage 46 and output stage 48. Finally, series-connected Zener D4 and resistor R9 serve to protect semiconductor elements in output stage 48 from excessive dissipation in the presence of battery overvoltages, as might be experienced with high-voltage booster starts.

Unijunction timing stage 46 is comprised of input transistor Q2, unijunction transistor Q3, capacitor C4, and resistors R11 and R12, the latter for respectively biasing the base of Q2 and Q3 with respect to ground. The Q2 collector and Q3 emitter are commonly connected to capacitor C4 and also to conductor 50 via series-connected resistors R6 and R7. Output stage 48 is comprised of an inverting transistor Q4, a Darlington output pair Q5 and Q6, capacitor C5, diode D5, and resistor R13. The Q4 base is connected to the base of Q3, and the Q4 collector is commonly connected to one side of capacitor C5 the other side of which is grounded and to the cathode of Zener D5, the anode of which is connected to the base of Q5 and also to ground across resistor R13.

Vacuum power unit 56 is secured to the housing of carburetor 14 and has a closable atmospheric port 60, a nonclosable atmospheric port 61 and also vacuum port 62 connected with a vacuum supply by a hose 63. Unit 56 also has a coil 54 that is energizable by Darlington pair Q5 and Q6 and is wound to encircle a metallic slug 59 having an atmospheric port 60 therethrough. Port 60 is sealable at internal end of slug 59 when coil 54 is energized to attract armature 64 affixed to flap 66 attached to sealing grommet 68 and resiliently pivoted at pivot 70 so as to open port 60 when coil 54 is deenergized. Also connected to vacuum unit 56 by the periphery thereof is a diaphragm 72 having a centrally located throttle stop rod 58 connected thereto and displaceable with respect to unit 56 through opening 74 therein sealing by ring 75. A spring 76 located on rod 58 between the inside of vacuum unit 56 and a collar 78 urges the latter to extend from unit 56 when atmospheric port 60 is closed as the result of the energization of winding 54. When winding 54 is deenergized, the internal vacuum aided by the resilient pivot 70 causes flap 66 to open port 60. The tip 80 of rod 58 is then retracted to a position 80a, shown exaggerated in FIG. 1, where tip 80 does not arrest the motion of lever 18. When winding 54 is energized the tip 80 of rod 58 is extended to position 80b, where it stops lever 18 from attaining the position otherwise urged by spring 28 acting on rod 20.

The operation of circuit 40 is generally as follows. Pulses of a frequency corresponding with the speed of engine 10 are generated by breaker points 32, filtered by C1 and R2, and applied to the Q1 base. When breakers 32 open, transistor Q1 is turned on to ground both the Q1 collector and also one side of differentiating capacitor C2. When the breakers subsequently close, Q1 is then turned off and other side of capacitor C2 simultaneously differentiates the falling wave front and applies the resulting positive spike to the base of transistor Q2, thereby turning it on and providing a discharge path for capacitor C4 therethrough. After the fall of the differentiated C2 spike, transistor Q2 is turned off again to allow capacitor C4 to commence charging to the potential of conductor 50 across resistors R6 and R7. Capacitor C4 continues to charge until discharged again upon the occurrence of another pulse generated by breakers 32. But, if the period between breaker pulses is sufficient, as when the frequency of the apparatus is below the set point, the charge on capacitor C4 will increase to attain the voltage required to break down unijunction Q3 before the occurrence of the next breaker pulse.

The set point frequency of the circuit is thus seen to be determined by the time between successive breaker pulses required to charge up the capacitor to break down unijunction Q3. This set point, moreover, may be increased by increasing variable resistance R7 to lower the potential charging capacitor C4 and in turn increase the C4 charging period before Q3 breakdown. Conversely, the set point frequency may be lowered by decreasing variable resistance R7. Unijunction Q3, when it does break down, provides an output potential at base one thereof which is applied across resistor R12 to the base of transistor Q4 to bias Q4 on and simultaneously discharge capacitor C5 therethrough.

Should the breaker pulses occur at a frequency too great to allow capacitor C4 to build up sufficiently to break down unijunction Q3, capacitor C5 would charge up from conductor 50 across resistor R10 to break down Zener D5 and thereby provide a biasing voltage to Darlington pair Q5 and Q6 across resistor R13. Current would then be drawn through the Q6 collector-to-emitter junction from battery 34, via ignition switch 36, diode D2, conductor 52 and coil 54. This would cause flap 66 to close atmospheric port 60. Diaphragm 72 would then be drawn toward port 62 thereby compressing spring 76 acting on collar 78 and extending throttle stop rod 58 to retard the motion of lever 18 when released by pedal 22 so as to prevent complete closure of throttle valve 16.

Subsequently, when the frequency of the breaker pulses decreases below that required to keep unijunction Q3 off, the potential at the cathode of Zener D5 would again be grounded with every second breaker pulse through Q4 so that conduction through Zener D5 is blocked, transistor Q6 accordingly turned off and coil 54 deenergized. Diode D6 connected across conductor 52 and the Q6 collector then provides a discharge path for energy stored in coil 54, thereby protecting Q5 and Q6 from the induced reverse voltages.

The operation of the circuit where the frequency of the breaker pulses is just at the set point frequency affords further understanding of the role of capacitor C5. If capacitor C5 were not in the circuit, at speeds corresponding to the set point frequency any variations in the period between breaker pulses due to conditions other than changes in engine speed could break down the Zener D5 intermittently to ultimately activate rod 58. Thus, tooth-to-tooth variations in the dimensions of the gears in link 30, in the dimensions of the contiguous surfaces of cam 31, or in the dimensions of the rubbing arm on the breaker activated by cam 31 might be sufficient to alter the period between successive pulses to sporadically break down Zener D5 even though the basic frequency were slightly below the set point. However, by introducing capacitor C5, the timing action afforded thereby averages out the pulse-to-pulse differences in duration between pulses at the same basic frequency so that the average duration between pulses at a basic frequency is employed to break down Zener D5 rather than the duration between any set of successive pulses.

Thus, a major purpose of capacitor C5 is to average out the effects of both manufacturing and wearing tolerances introduced by the mechanical and electrical components comprising the path to the gate of unijunction Q3. Capacitor C5 thereby prevents output circuit 48, and in turn winding 54 and rod 58, from being intermittently activated and deactivated for the first few pulses that occur when speed of apparatus first exceeds the set point.

For the values of the components employed to construct the circuit shown in FIG. 1 and listed in Table 1 below, the period of averaging at a set point frequency of 1,300 r.p.m. is approximately 10 pulses allowing cam 31 and the linkage 30 driving it to make at least one revolution after the set point frequency has been exceeded before the throttle stop is advanced. However, changes in the voltage charging capacitor C5 could produce variations in the set point frequency offsetting those removed by the action of capacitor C5 in averaging the effects of tolerances in the mechanical and electrical components. To enable capacitor C5 to perform its function and allow the timing precision of the overall circuit to be attained without hysteresis, capacitor C5 must also be charged from a constant reference, here the same reference provided for capacitor C4 by the connection of Zener D3 to battery supply conductor 50.

The following table lists the values for types of components that may be employed to embody the configuration of the invention as shown in FIG. 1.

TABLE OF COMPONENT VALUES AND TYPES—FIGURE 1

| Resistor | Ohms | Diode | Type & Rating |
|---|---|---|---|
| R1 | 3.9K | D1 | 150 PRV Surmetic |
| 2 | 1.8K | 2 | 1966808 Surmetic |
| 3 | 3.9K | 3 | 10 V.Zener |
| 4 | 3.3K | 4 | 20 V. Zener |
| 5 | 330 | 5 | 6.2 V. Zener |
| 6 | 50K | 6 | 1966808 Surmetic |
| 7 | 25K or 50K | | |
| 8 | 1.2K | Transistor | Type |
| 9 | 1K | | |
| 10 | 15K | Q1 | 1968958 NPN |
| 11 | 1K | 2 | 1968958 NPN |
| 12 | 47 | 3 | 2N1671 UJT |
| 13 | 33K | 4 | 1968958 NPN |
| | | 5 | D28Cl Darlington |

| Capacitor | Rating |
|---|---|
| C1 | .068 mfd., 100 V. |
| 2 | .068 mfd., 100 V. |
| 3 | 20 mfd., 25 V. |
| 4 | .15 mfd., 75 V. |
| 5 | 4 mfd., 25 V. |

In addition to the preferred embodiment of the invention described hereinabove, other applications of the invention circuit are possible. In one such application, it may be desirable to use the speed sensitive circuit to allow the shift gear in a vehicle transmission to engage at just a certain speed and to prohibit engagement outside a small range about this speed. Such control of gear shifting would be desirable for instance with high-performance machines where the gears might be stressed unnecessarily if engagement were attempted outside the narrow range or, if gear engagement were unsuccessful during shifting, the engine could become unloaded and could therefore tend to run away, possibly damaging itself.

In yet another application, it may be desirable to use the circuit to control the injection of fuel into the combustion chamber of an engine at one rate of change with changes in engine speed up to one speed and at another rate of change above that speed. The control of the fuel rate/engine speed characteristic thereby afforded would in turn yield better engine performance and more complete combustion of fuel.

It will be obvious to those skilled in the art that modifications and changes may be made without departing from my invention and I, therefore, aim in the appended claims to cover such modifications and changes as fall within the true spirit and scope of my invention.

What I claim as new and desire to secure by letters of patent of the United States is:

1. In a motor vehicle comprising a voltage source, an engine having throttle means for controlling the speed thereof, and means normally biasing said throttle means towards a closed position, a throttle control system comprising:
   a. throttle stop means operable to prevent complete closure of said throttle means;
   b. signal generating and shaping means for developing a pulsating signal proportional to the speed of said engine;
   c. frequency responsive means connected with said signal generating and shaping means and operative in response to said pulsating signal for producing a first output when the speed of said engine is above a predetermined speed and a second output when the speed of said engine is below said predetermined speed; and
   d. a constant impedance breakdown device responsive to said first and second outputs for controlling said throttle stop means whereby said throttle means is prevented from complete closure while the engine speed is above said predetermined speed and said throttle means is closed when the speed of said engine drops below said predetermined speed.

2. In a motor vehicle comprising a voltage source, an engine having throttle means for controlling the speed thereof, and means normally biasing said throttle means towards a closed position, a throttle control system comprising:
   a. throttle stop means operable to prevent complete closure of said throttle means;
   b. signal generating and shaping means for developing a pulsating signal proportional to the speed of said engine;
   c. first timing means connected with said signal generating and shaping means and operative in response to said pulsating signal for producing a first output when the speed of said engine is above a predetermined speed and a second output when the speed of said engine is below said predetermined speed;
   d. second timing means comprising a transistor connected with said first timing means to receive said first and second output signals therefrom, a resistor connected with said transistor and said source and a capacitor connected with said resistor, whereby said capacitor is charged to a predetermined voltage through said resistor when the output of said first timing means is one of said first and second output signals and is discharged through said transistor before attaining said predetermined voltage when the output of said first timing means is the other of said first and second output signals;
   e. a constant impedance breakdown device connected with said capacitor and operative to break down when said capacitor is charged to said predetermined voltage; and
   f. utilization means connected with said constant impedance breakdown device and operable to control said throttle stop means whereby said throttle means is prevented from complete closure while the engine speed is above said predetermined speed and said throttle means is closed when the speed of said engine drops below said predetermined speed.

3. In a motor vehicle comprising an engine having throttle means for controlling the speed thereof and means biasing said throttle means towards a closed position, a throttle control system for preventing closure of said throttle means until said engine speed falls below a predetermined speed comprising:
   a. a source of constant potential;
   b. signal generating and shaping means for developing a pulsating signal proportional to the speed of the said engine;
   c. first timing means comprising a first transistor connected with said signal generating and shaping means, a resistor connected with said source and said first transistor, a capacitor connected with said first transistor and said resistor, and a unijunction transistor connected with said capacitor whereby said unijunction transistor produces a first output when the speed of said engine is above said predetermined speed and a second output when the speed of said engine is below said predetermined speed;
   d. second timing means comprising a second transistor connected with said unijunction transistor to receive said first and second output signals therefrom, a second resistor conconnected with said second transistor and said source, and a second capacitor connected with said second resistor, whereby said second capacitor is charged to a predetermined voltage through said resistor when the output from said first timing means is one of said first and second output signals and is discharged through said second transistor before attaining said predetermined voltage when the output of said first timing means is the other of said first and second output signals;

e. a constant impedance breakdown device connected with said second capacitor and operative to breakdown when said second capacitor is charged to said predetermined voltage; and f. utilization means connected with said constant impedance breakdown device and operative upon the break down thereof to prevent complete closure of said throttle means until the speed of said engine drops below said predetermined speed.

* * * * *

UNITED STATES PATENT OFFICE
CERTIFICATE OF CORRECTION

Patent No. 3,645,241     Dated February 29, 1972

Inventor(s) Gerald O. Huntzinger

It is certified that error appears in the above-identified patent and that said Letters Patent are hereby corrected as shown below:

Column 2, line 22, after "another", insert -- general --;
line 51, "airflow" should read -- air flow --;

Column 3, line 60, "sealing" should read -- sealed --;

Column 5, line 48, "invention" should read -- inventive --;
line 50, "gear" should read -- gears --.

Signed and sealed this 19th day of February 1974.

(SEAL)
Attest:

EDWARD M. FLETCHER, JR.
Attesting Officer

C. MARSHALL DANN
Commissioner of Patents